US011121560B2

(12) United States Patent
Singhal et al.

(10) Patent No.: US 11,121,560 B2
(45) Date of Patent: Sep. 14, 2021

(54) HOT-PLUGGABLE DUAL BATTERY WITH PASS THROUGH CHARGING

(71) Applicant: Google Inc., Mountain View, CA (US)

(72) Inventors: Toshak Singhal, Mountain View, CA (US); Willis Calkins, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 230 days.

(21) Appl. No.: 15/694,822

(22) Filed: Sep. 3, 2017

(65) Prior Publication Data
US 2019/0074698 A1 Mar. 7, 2019

(51) Int. Cl.
H02J 7/00 (2006.01)
H02J 7/34 (2006.01)
H01M 10/42 (2006.01)
H01R 24/62 (2011.01)
H01R 107/00 (2006.01)

(52) U.S. Cl.
CPC ............ H02J 7/0013 (2013.01); H02J 7/008 (2013.01); H02J 7/342 (2020.01); H01M 10/4257 (2013.01); H01R 24/62 (2013.01); H01R 2107/00 (2013.01); H02J 7/00 (2013.01); H02J 7/34 (2013.01); H02J 2207/40 (2020.01)

(58) Field of Classification Search
CPC ........ H02J 7/0013; H02J 7/0055; H02J 7/008; H02J 7/0054; H02J 2007/0098; H02J 2007/0062; H02J 7/34; H02J 7/342; H02J 7/00; H02J 2207/40; H01R 24/62; H01R 2107/00; H01M 10/4257; Y02E 60/10
See application file for complete search history.

(56) References Cited

U.S. PATENT DOCUMENTS 9,594,415 B2 * 3/2017 Obie ...................... G06F 1/266
10,241,954 B2 * 3/2019 Nge .................... G06F 13/4282
(Continued)

FOREIGN PATENT DOCUMENTS

CN 105491248 A 4/2016
EP 3051382 A1 8/2016
(Continued)

OTHER PUBLICATIONS

International Search Report and Written Opinion for International Application No. PCT/US2018/044554, dated Oct. 16, 2018, 11 pages.
(Continued)

Primary Examiner — Drew A Dunn
Assistant Examiner — Sailesh Thapa
(74) Attorney, Agent, or Firm — Brake Hughes Bellermann LLP

(57) ABSTRACT

Techniques of charging electronic devices involve directing electrical power from a first device to the battery of a second device in response to the first device being in a first state, and directing electrical power from the second device to the battery of the first device in response to the first device being in a second state. For example, in response to a connection being established between a first device (e.g., a tablet computer) and a second device (e.g., a monitor), a charger of the first device detects a state of charge of the battery of the first device and a state of charge of the second device.

19 Claims, 17 Drawing Sheets

(56) References Cited

U.S. PATENT DOCUMENTS

| | | | |
|---|---|---|---|
| 2003/0178967 A1* | 9/2003 | Khatri | G06F 1/3203 320/103 |
| 2008/0074077 A1* | 3/2008 | Wong | H02J 7/0068 320/103 |
| 2012/0019193 A1* | 1/2012 | Yu | G06F 1/266 320/103 |
| 2013/0020875 A1* | 1/2013 | Wozniak | H01M 10/46 307/72 |
| 2015/0270733 A1* | 9/2015 | Inha | H02J 7/342 320/103 |
| 2016/0216757 A1* | 7/2016 | Kim | G06F 1/3287 |
| 2017/0063123 A1* | 3/2017 | Horie | H02J 7/0054 |
| 2017/0229877 A1 | 8/2017 | Zhang et al. | |
| 2018/0109134 A1* | 4/2018 | Carpenter | H02J 7/345 |

FOREIGN PATENT DOCUMENTS

| | | |
|---|---|---|
| EP | 3098922 A1 | 11/2016 |
| TW | M514693 U | 12/2015 |
| TW | 201610691 A | 3/2016 |
| WO | 2016209672 A1 | 12/2016 |

OTHER PUBLICATIONS

Enos, et al., "A primer on USB Type-C and Power Delivery applications and requirements", Retrieved on Oct. 8, 2018 from http://www.ti.com/lit/wp/slyy109/slyy109.pdf, XP055513109, Nov. 2016, 17 pages.

Office Action for Taiwanese Application No. 107127197 (with English translation), dated May 22, 2019, 21 pages.

\* cited by examiner

HOT-PLUGGABLE DUAL BATTERY WITH PASS THROUGH CHARGING

TECHNICAL FIELD

This description relates to battery chargers in portable electronic devices.

BACKGROUND

Some portable electronic devices have accessory devices that require power. For example, a user may wish to connect a tablet computer to an external monitor. Some accessories connect with a portable device over a power-delivering adapter, e.g., a Universal Serial Bus (USB) Type C adapter. Such an electronic accessory is configured to draw power from a portable device to which the electronic accessory is connected.

SUMMARY

In one general aspect, an electronic system includes a first device and a second device. The first device includes a set of charger ports, a battery, memory, and controlling circuitry coupled to the memory. The second device includes a set of charger ports and a battery. The controlling circuitry of the first device is configured to, in response to the first device being in a first state of a plurality of states, direct electrical power from the first device to the battery of the second device via a connection between a port of the set of charger ports of the first device and a port of the set of charger ports of the second device. The controlling circuitry of the first device is further configured to, in response to the first device being in a second state of the plurality of states, direct electrical power from the second device to the battery of the first device via the connection between the port of the set of charger ports of the first device and the port of the set of charger ports of the second device.

The details of one or more implementations are set forth in the accompanying drawings and the description below. Other features will be apparent from the description and drawings, and from the claims.

DETAILED DESCRIPTION

In a conventional arrangement, an accessory draws power from a portable device to which it is connected. Nevertheless, this arrangement is inflexible and may be inconvenient. For example, when the portable device is not available, the accessory may not be conveniently charged. Furthermore, if the portable device is not charged and is not near an external power source (e.g., a wall plug), the portable device may not draw power from a charged accessory.

In accordance with the implementations described herein and in contrast with the above-described conventional arrangements of portable devices and accessories, improved techniques of charging electronic devices involve directing electrical power from a first device to the battery of a second device in response to the battery of the first device being in a first state, and directing electrical power from the second device to the battery of the first device in response to the battery of the first device being in a second state. For example, in response to a connection being established between a first device (e.g., a tablet computer) and a second device (e.g., a monitor), a charger of the first device detects a state of charge of the battery of the first device and a state of charge of the second device. In some implementations, if the state of charge of the battery of the first device is close to or equal to 100% of full charge or if the first device is also connected to a wall plug, then the first device may direct electrical power to the second device over the connection. Alternatively, if the state of charge of the battery of the first device is less than the state of charge of the battery of the second device, then the battery of the first device may accept electrical power from the second device. Advantageously, configuring both the first device and the second device to charge the other provides a flexible arrangement for a user of both devices.

Figure 1A:
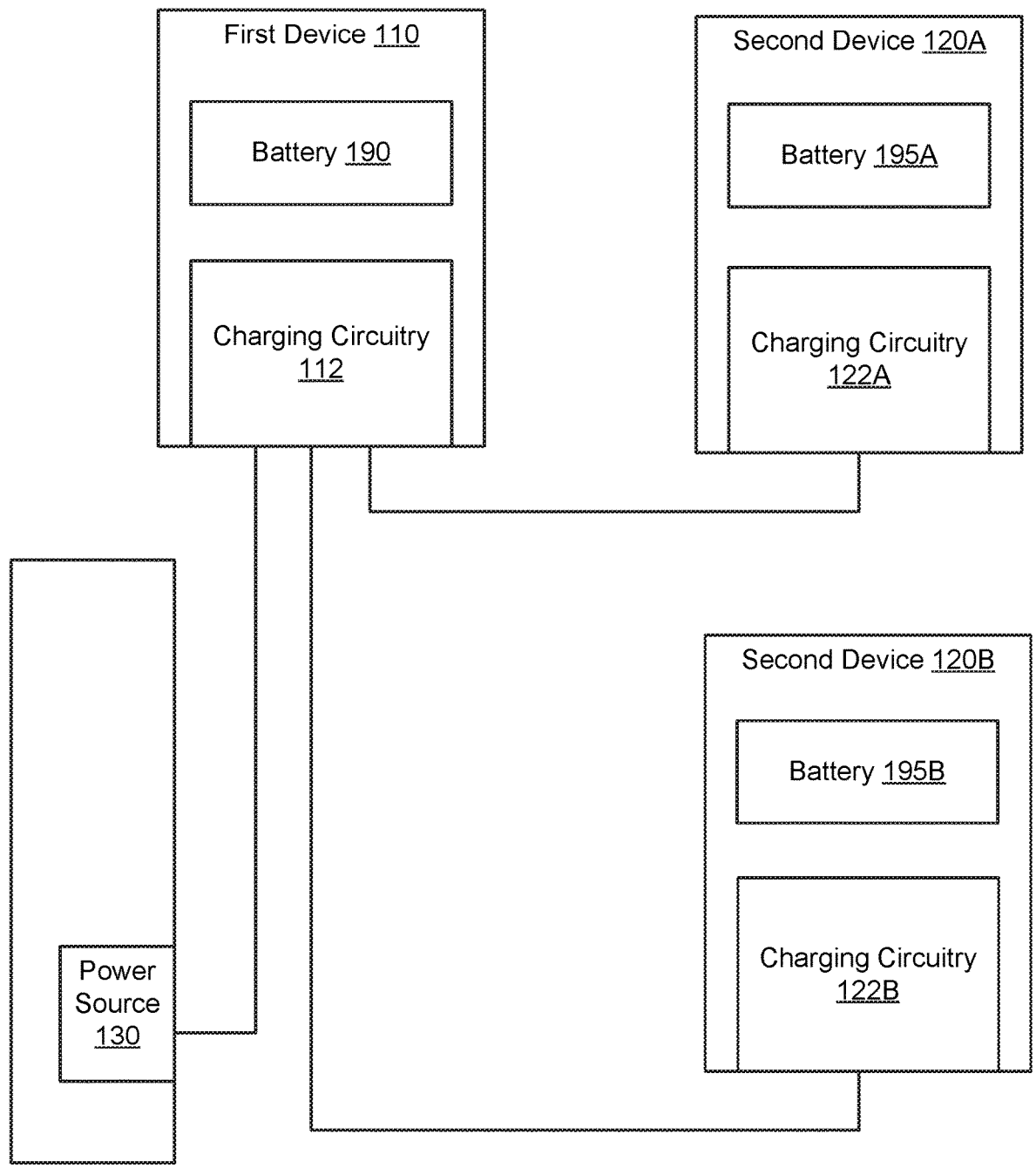
FIGS. 1A-1I are diagrams that illustrate an example electronic system including improvements described herein.

FIG. 1A is a diagram that illustrates an example electronic environment 100 including the improvements. The electronic environment 100 includes a first device 110, second devices 120A and 120B, and a power source 130. Generally, there can be more than two second devices but there are only two second devices described here for simplicity.

In some implementations, the first device 110 is a portable electronic device such as a tablet computer or a smartphone. In some implementations, the first device 110 is a base of a laptop computer. In some implementations, the first device 110 is the laptop computer itself. Generally, the first device 110 is an electronic device that may provide a complete functionality on its own (e.g., running apps, playing audio and/or video media, operating system, etc.).

As illustrated in FIG. 1A, the first device 110 includes charging circuitry 112. The charging circuitry 112 is configured to direct electric power to or from one or more of the second devices 120A, 120B, or from the power source 130 to the battery 190 of the first device 110 and/or a battery (e.g., battery 195A, 195B) of one or more of the second devices 120A, 120B. In some implementations, to where the charging circuitry 112 directs electric power depends on a state of charge of the battery 190 of the first device 110. For example, in some implementations, the charging circuitry 112 is configured to direct electric power to the first device 110 when a state of charge of a battery 190 of the first device 110 is less than a full charge, e.g., 100% or some other value representing a maximum charge of the battery. FIGS. 1B-1I illustrate various charging scenarios.

Each of the second devices 120A, 120B is a portable electronic device that provides additional functionality to the first device 110. In some implementations, second device 120A or second device 120B is a monitor. In some implementations, second device 120A is a lid of a laptop computer when the first device 110 is the base of the laptop computer. In some implementations, each second device, e.g., second device 120A, is configured to function only in conjunction with the first device 110. Each second device 120A, 120B has corresponding charging circuitry (e.g., second device 120A has charging circuitry 122A).

The charging circuitry corresponding to each second device (e.g., charging circuitry 122A corresponding to second device 120A) is configured to direct electric power (e.g., current) to or from the first device 110 based on a state of the first device 110 as described above. Again, FIGS. 1B-1I illustrate various charging scenarios.

As described above, the charging circuitry 112, in conjunction with the charging circuitry 122A of the second device 120A, is configured to provide electric power to the battery 190 of the first device 110 and the battery 195A of the second device 120A, in that order. In some cases, as opposed to conventional arrangements of portable devices and accessories, this improvement results in a second device 120A or 120B that may charge the first device 110 when connected and depending on the scenario. Examples of such scenarios are described with respect to FIGS. 1B-1I.

Figure 1B:
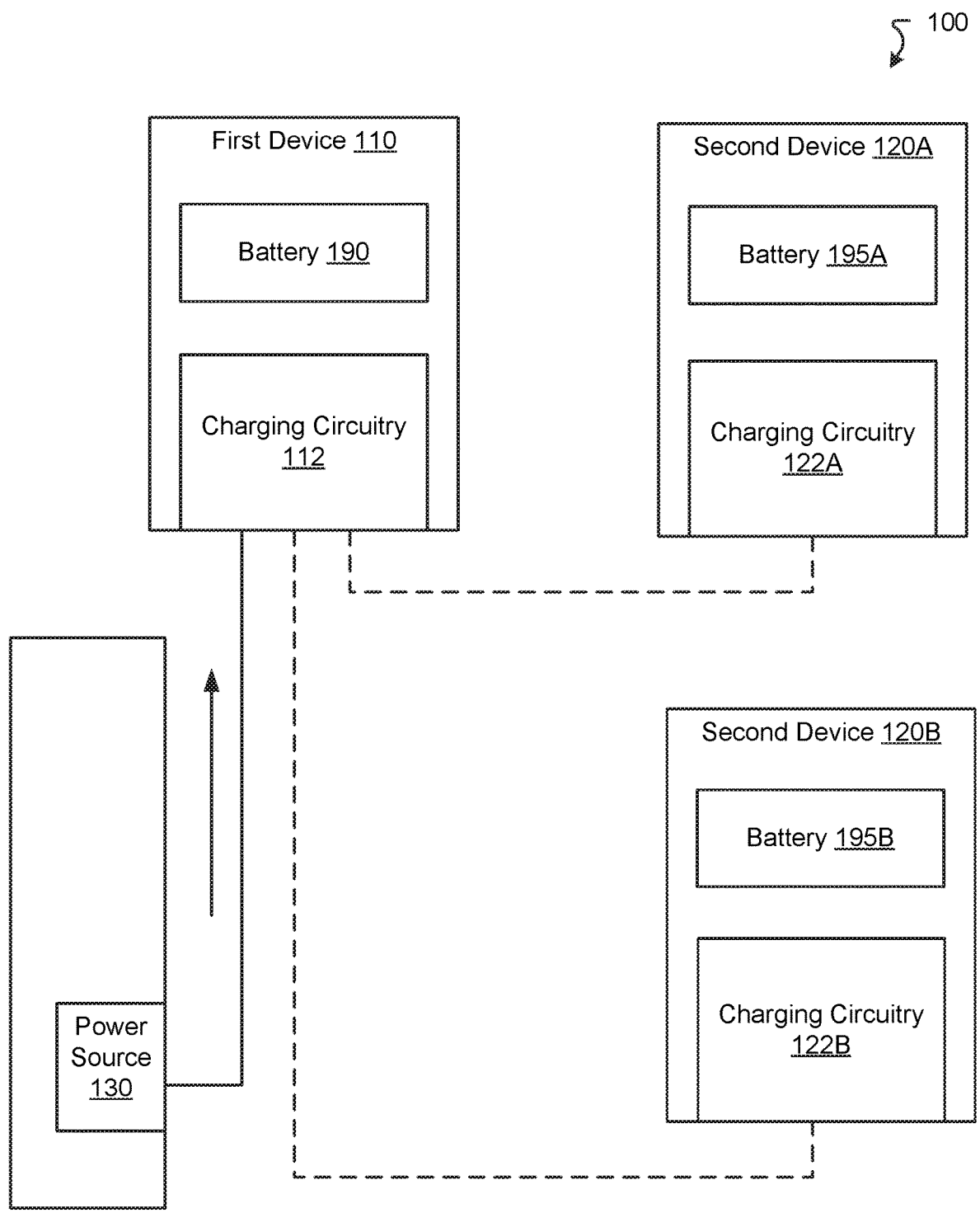

FIG. 1B is a diagram illustrating an example charging scenario according to the improvement described herein. In this scenario, the first device 110 is connected to the power source 130 (e.g., external power source, power outlet) and to each of the second devices 120A and 120B. In FIG. 1B (and in subsequent FIGS. 1C-1I), the dashed lines indicate a connection over which no electrical power is directed while the solid line indicates a connection over which electrical power is directed. FIG. 1B illustrates electrical power flowing from the power source 130 to the battery 190 of the first device 110. In some implementations, this scenario occurs when the batteries 190, 195A, and 195B is less than fully charged. Accordingly, the first device 110 may be considered to be a primary device whose battery 190 gets charged first.

Figure 1C:
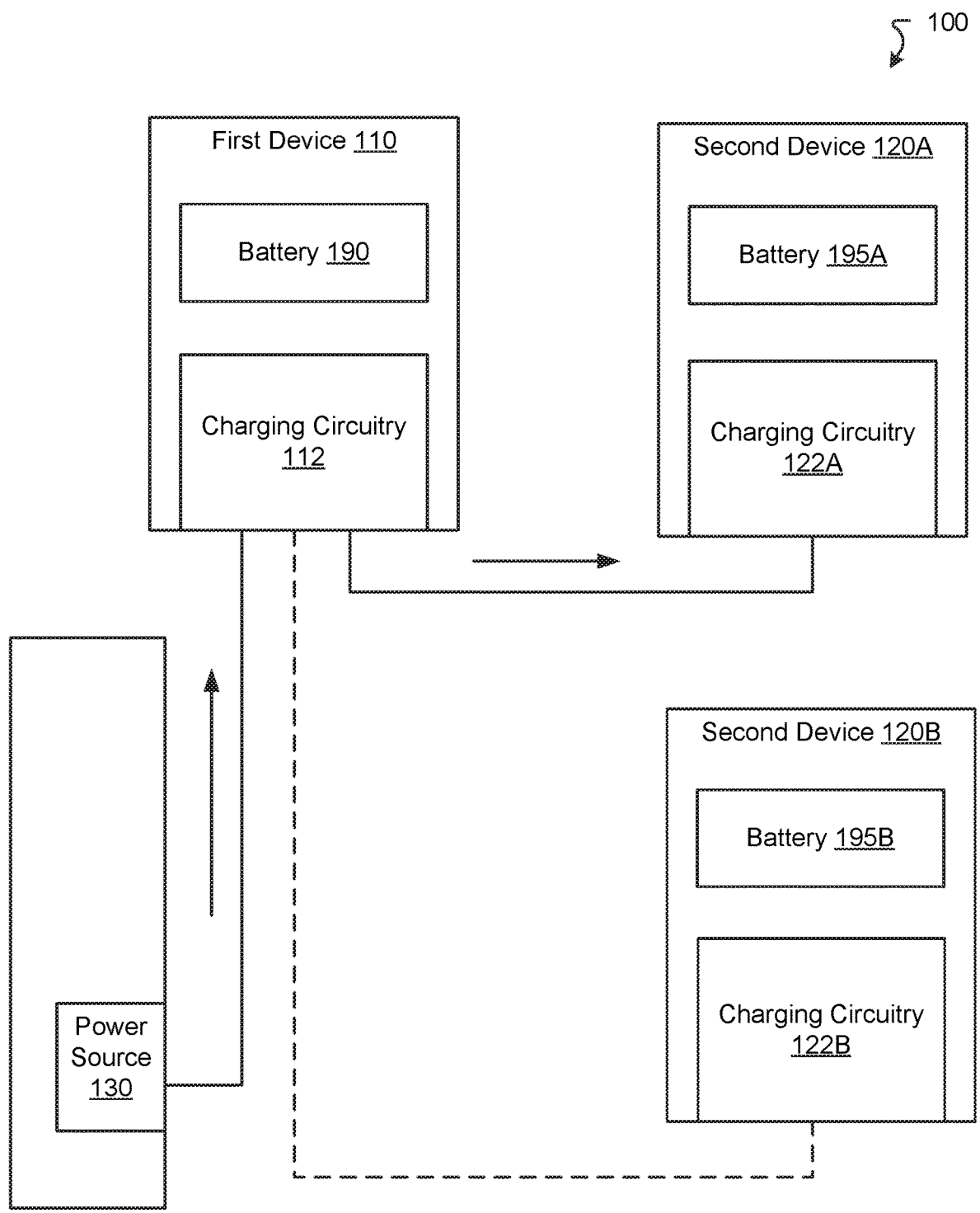

FIG. 1C is a diagram illustrating an example charging scenario according to the improvement described herein. This scenario is similar to that illustrated in FIG. 1B except that electrical power is directed from the battery 190 to the battery 195A. In some implementations, this scenario occurs when the battery 190 is fully charged and the battery 195A is less than fully charged.

Figure 1D:
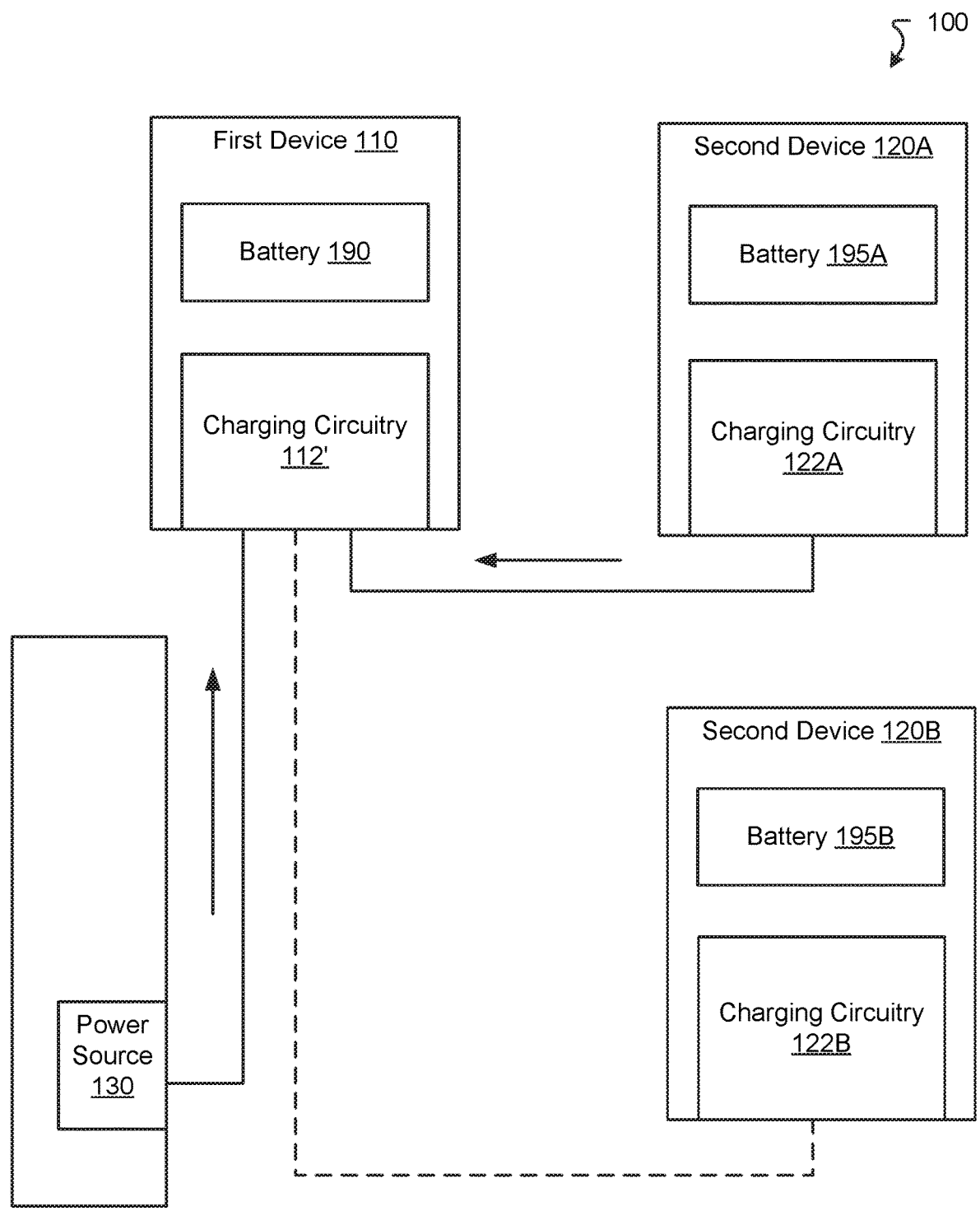

FIG. 1D is a diagram illustrating an example charging scenario according to the improvement described herein. This scenario is similar to that illustrated in FIG. 1B except that electrical power is directed to the battery 190 from both the power source 130 and the battery 195A. In some implementations, as illustrated in FIG. 1D, the charging circuitry 112' is modified to reflect additional capability to receive charge from multiple sources. In some implementations, this scenario occurs when the battery 195A is more fully charged than the battery 190.

Figure 1E:
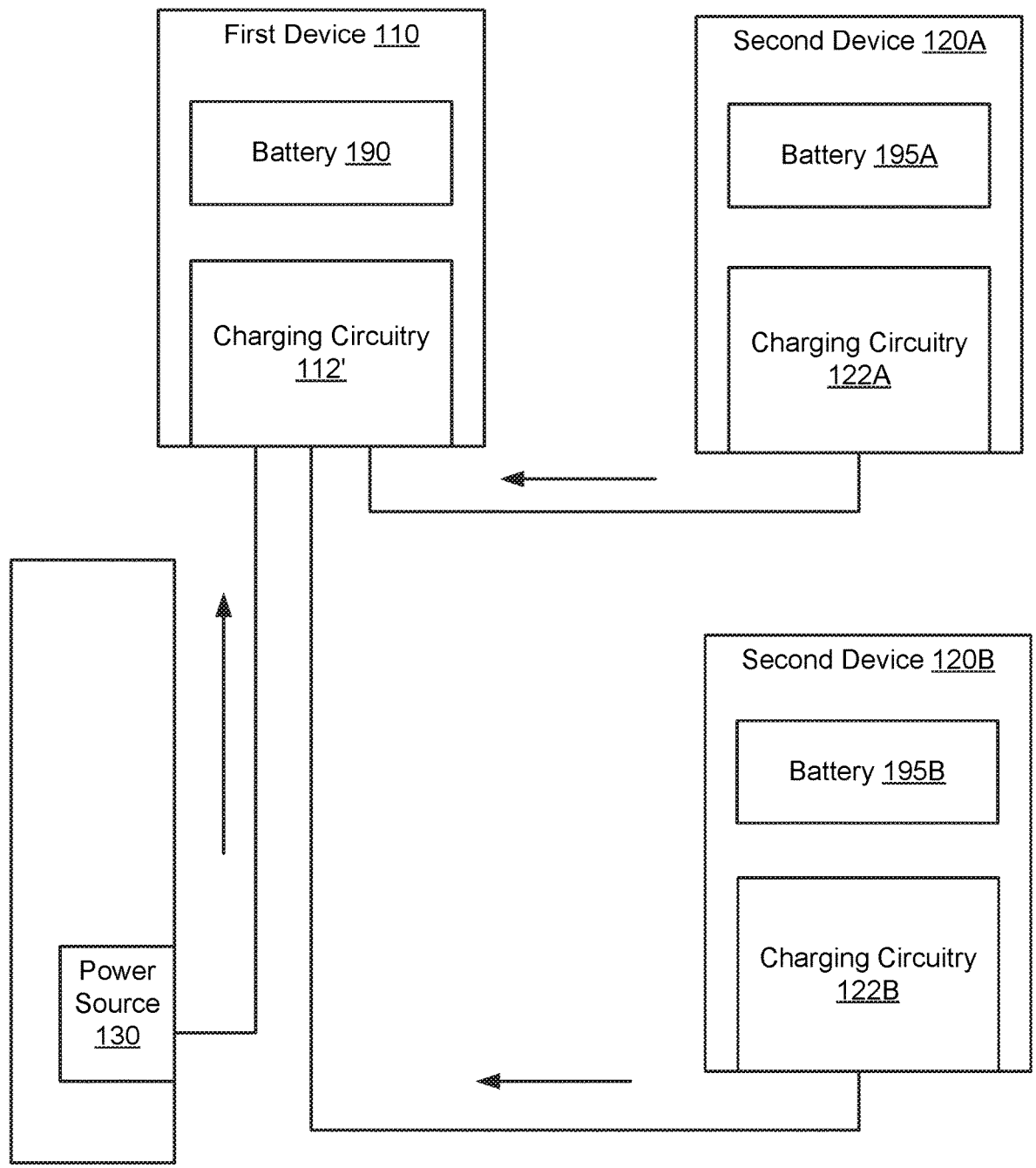

FIG. 1E is a diagram illustrating an example charging scenario according to the improvement described herein. This scenario is similar to that illustrated in FIG. 1D except that electrical power is directed to the battery 190 from the power source 130 and the batteries 195A and 195B. In some implementations, as illustrated in FIG. 1E, the charging circuitry 112' is modified to reflect additional capability to receive charge from multiple sources. In some implementations, this scenario occurs when the batteries 195A and 195B are more fully charged than the battery 190.

Figure 1F:
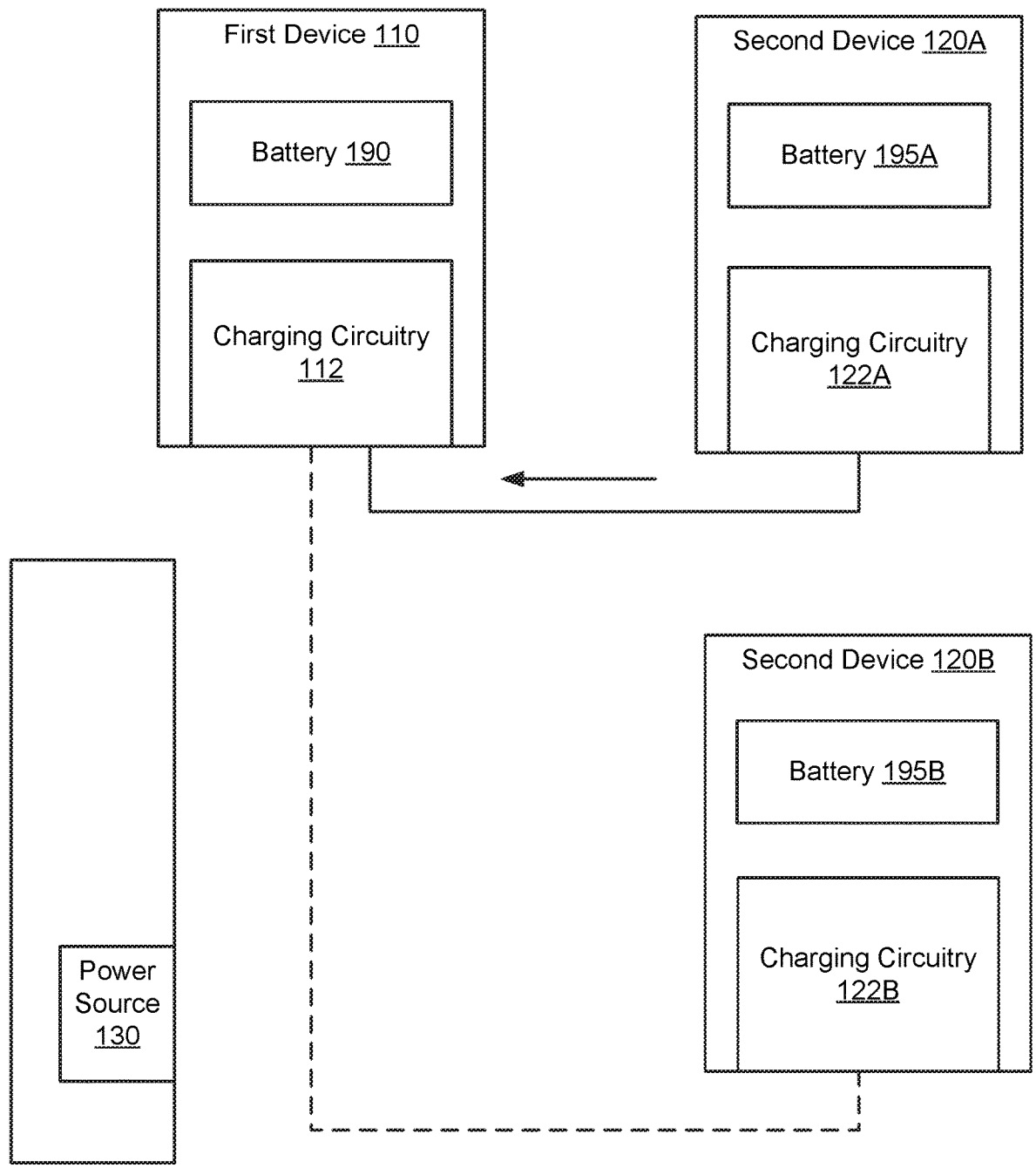

FIG. 1F is a diagram illustrating an example charging scenario according to the improvement described herein. This scenario is similar to that illustrated in FIG. 1D except that there is no connection between the power source and the first device 110. In this case, the battery 190 receives electrical power solely from the battery 195A. In some implementations, this scenario occurs when the battery 195A is more fully charged than the battery 190.

Figure 1G:
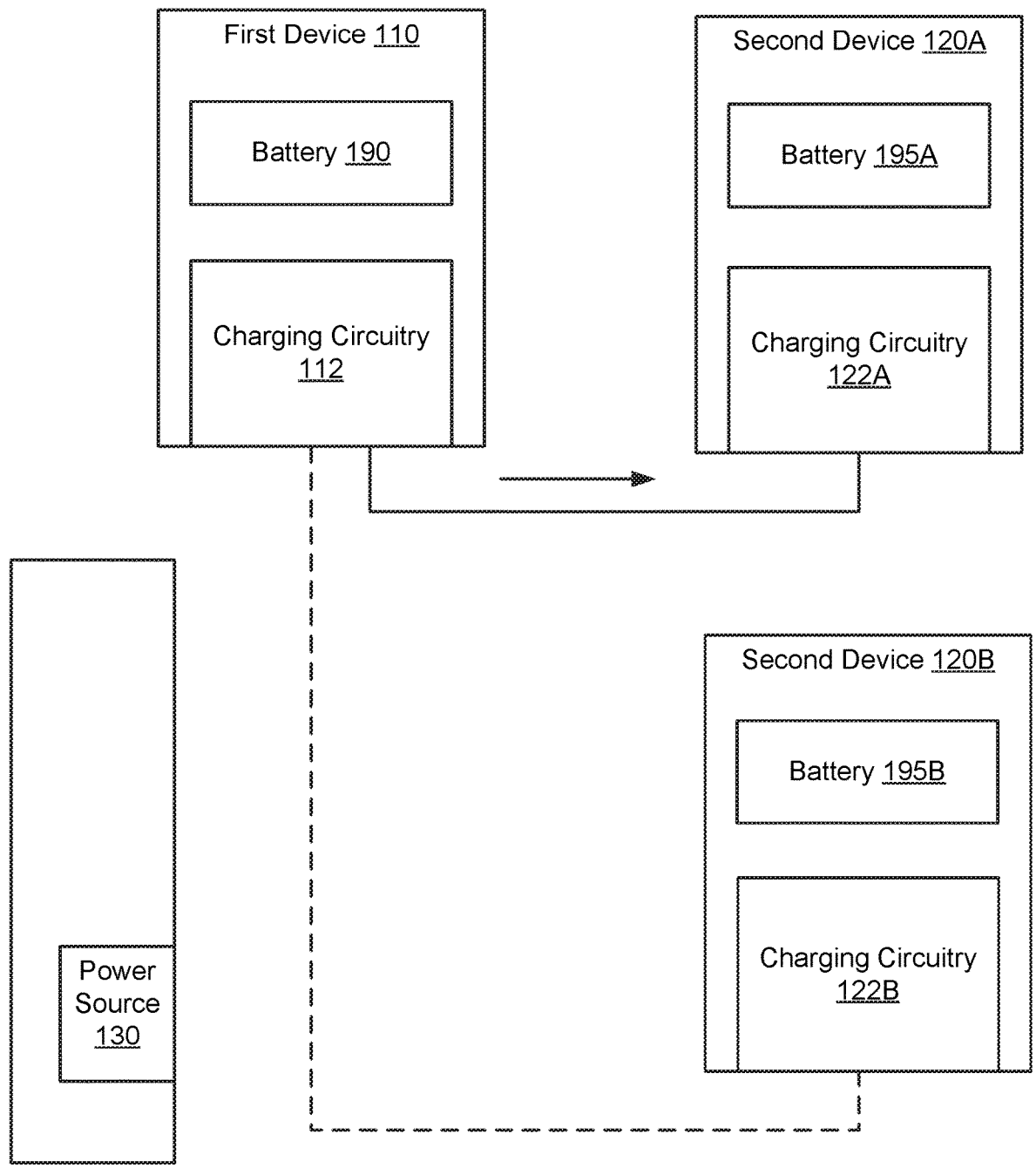

FIG. 1G is a diagram illustrating an example charging scenario according to the improvement described herein. This scenario is similar to that illustrated in FIG. 1F except that electrical power is directed from battery 190 to battery 195A. In some implementations, this scenario occurs when the batteries 190 and 195B are fully charged but battery 195A is not.

Figure 1H:
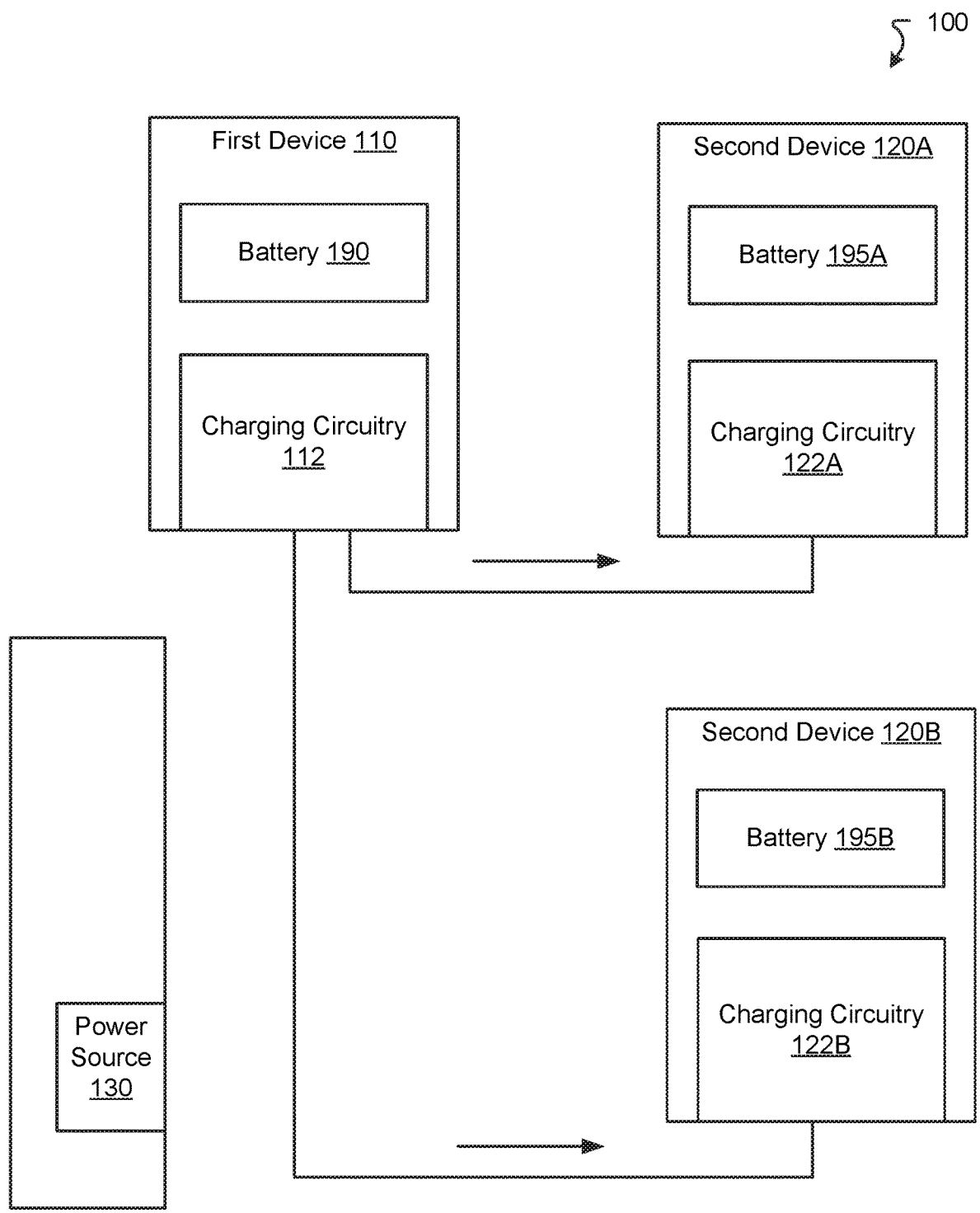

FIG. 1H is a diagram illustrating an example charging scenario according to the improvement described herein. This scenario is similar to that illustrated in FIG. 1G except that electrical power is directed from battery 190 to batteries 195A and 195B. In some implementations, this scenario occurs when the battery 190 is fully charged but batteries 195A and 195B are not.

Figure 1I:
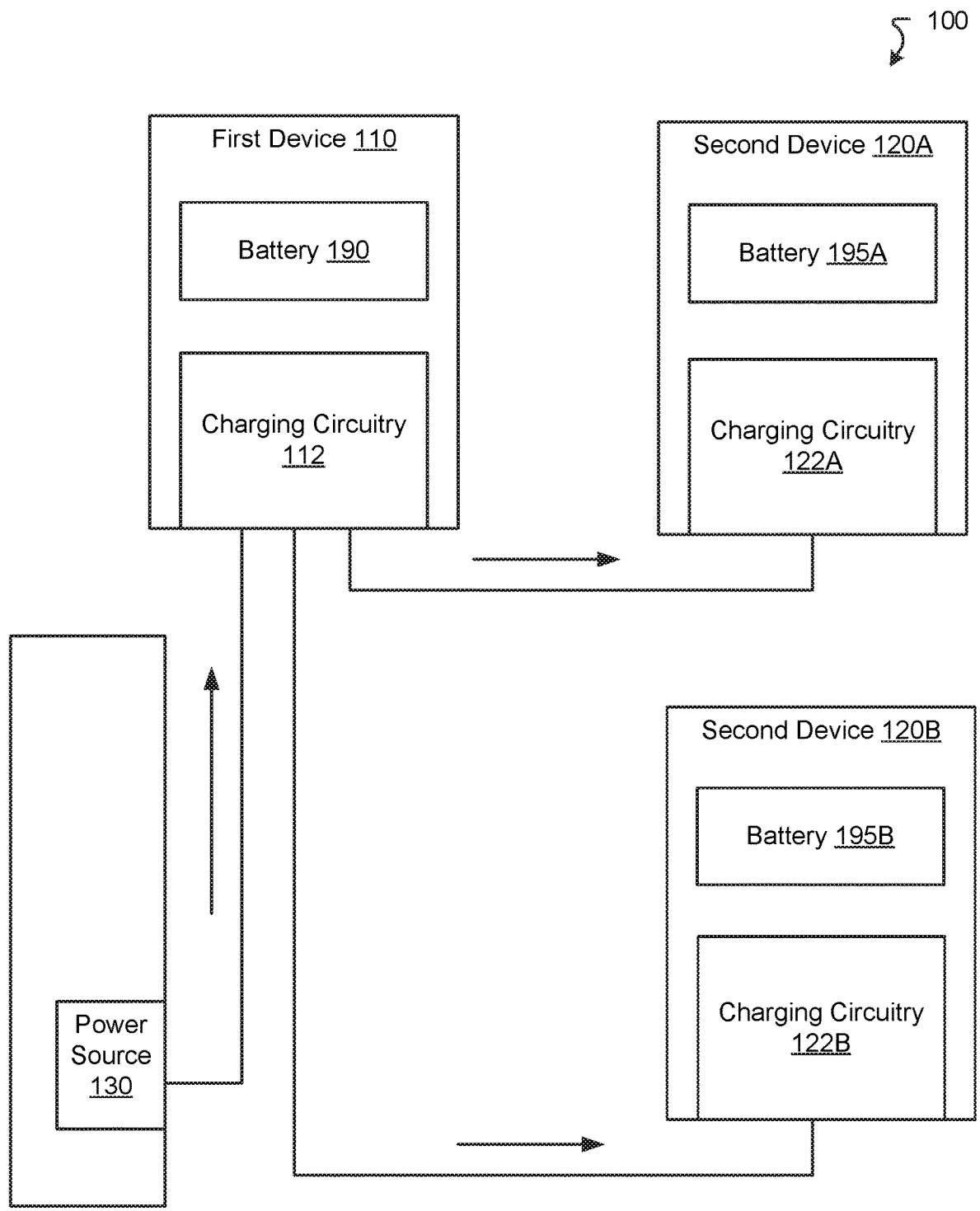

FIG. 1I is a diagram illustrating an example charging scenario according to the improvement described herein. This scenario is similar to that illustrated in FIG. 1H except that electrical power is also supplied from the power source 130.

Figure 6A:
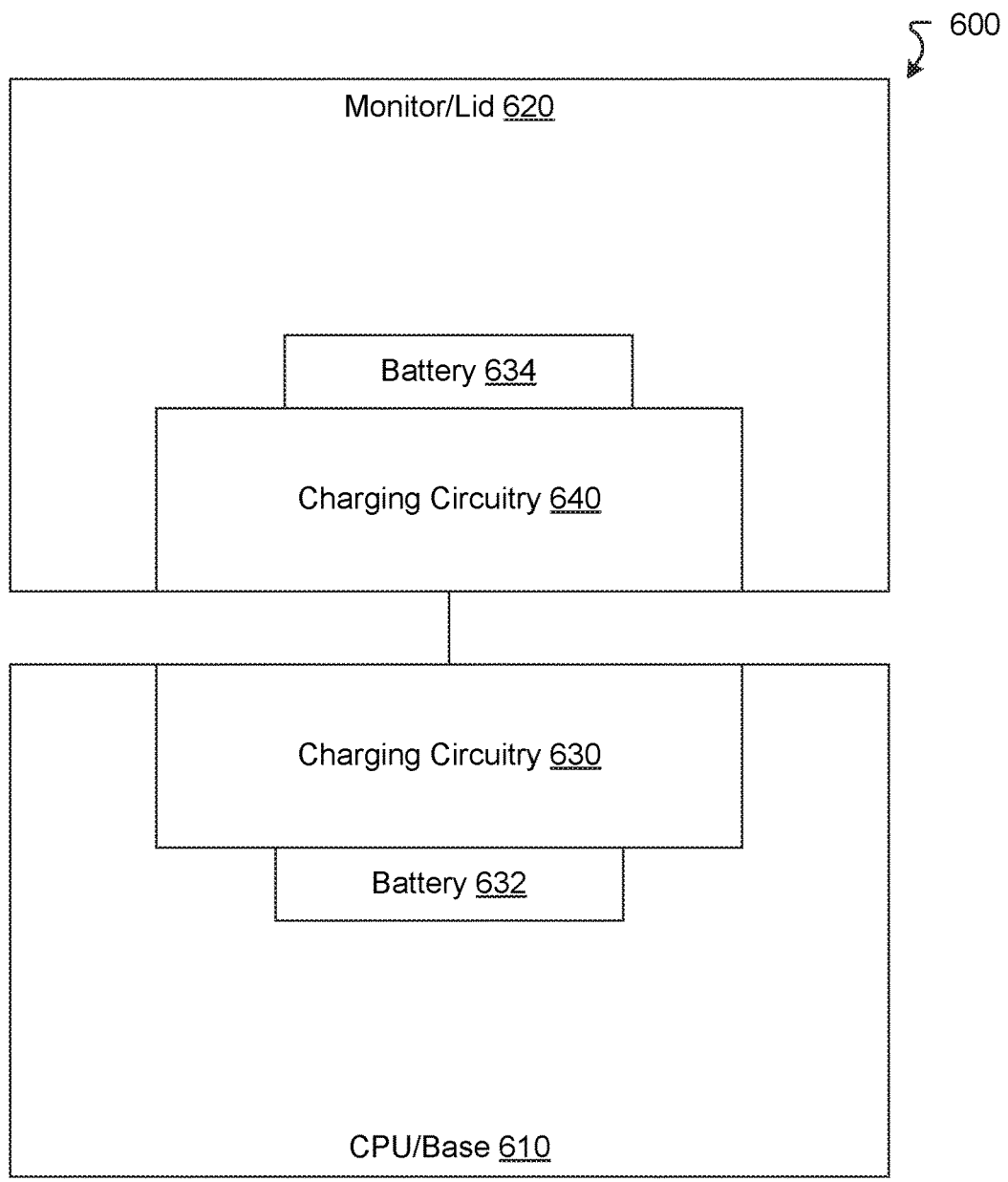
FIGS. 6A-6B are diagrams illustrating an example laptop system including improvements described herein.
Figure 6B:
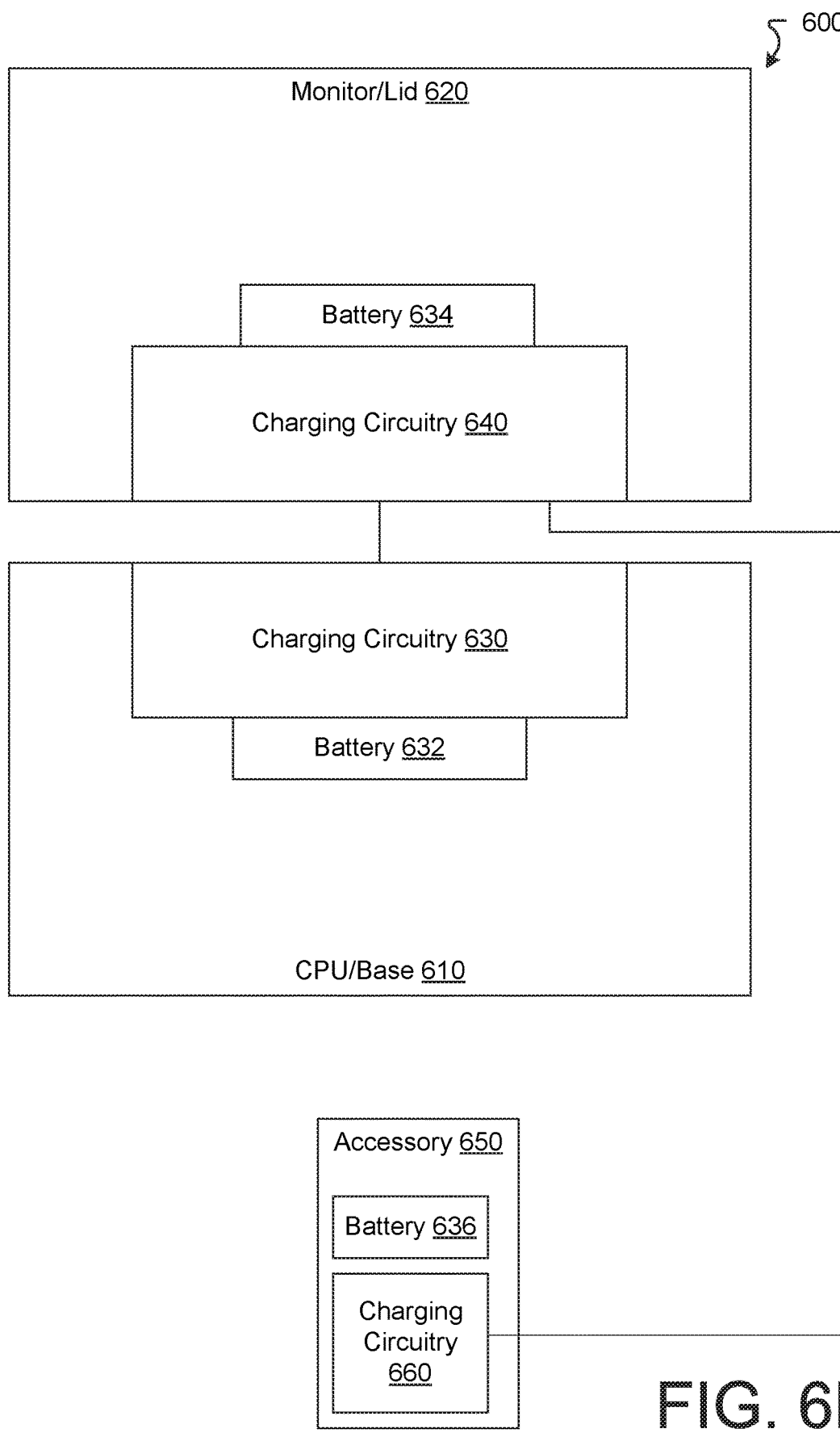

An example of such an electronic environment 100 is shown in FIGS. 6A and 6B. FIG. 6A illustrates a laptop 600 according to the improvements described herein. The laptop 600 includes a CPU/base 610 (i.e., first device) and a monitor/lid 620 (i.e., second device). The base 610 has charging circuitry 630 and a battery 632, and the lid 620, hingedly connected to the base 610, has charging circuitry 640 and a battery 634. Accordingly, the battery 632 may either accept electrical power from the battery 634 or direct electrical power to the battery 634 depending on the states of charge of the batteries 632 and 634 as shown in FIGS. 1F and 1G.

FIG. 6B illustrates the laptop as shown in FIG. 6A but with an accessory 650 connected to the base 610. The accessory 650 has a battery 636 and charging circuitry 660. Accordingly, the battery 632 may accept electrical power from either or both of the batteries 634 or 636. Alternatively, the charging circuitry 630 may direct electrical power to either of the batteries 634 or 636 depending on the states of charge of the batteries 632 and 634 as shown in FIGS. 1F-1I.

The charging circuitry 112 as shown in FIG. 1A is configured to provide enhanced flexibility in providing this charge to first and second devices 110 and 120A by enabling various switches to direct current both to and from the first device 110 and the second device 120A. The components of these devices are described in what follows.

Figure 2A:
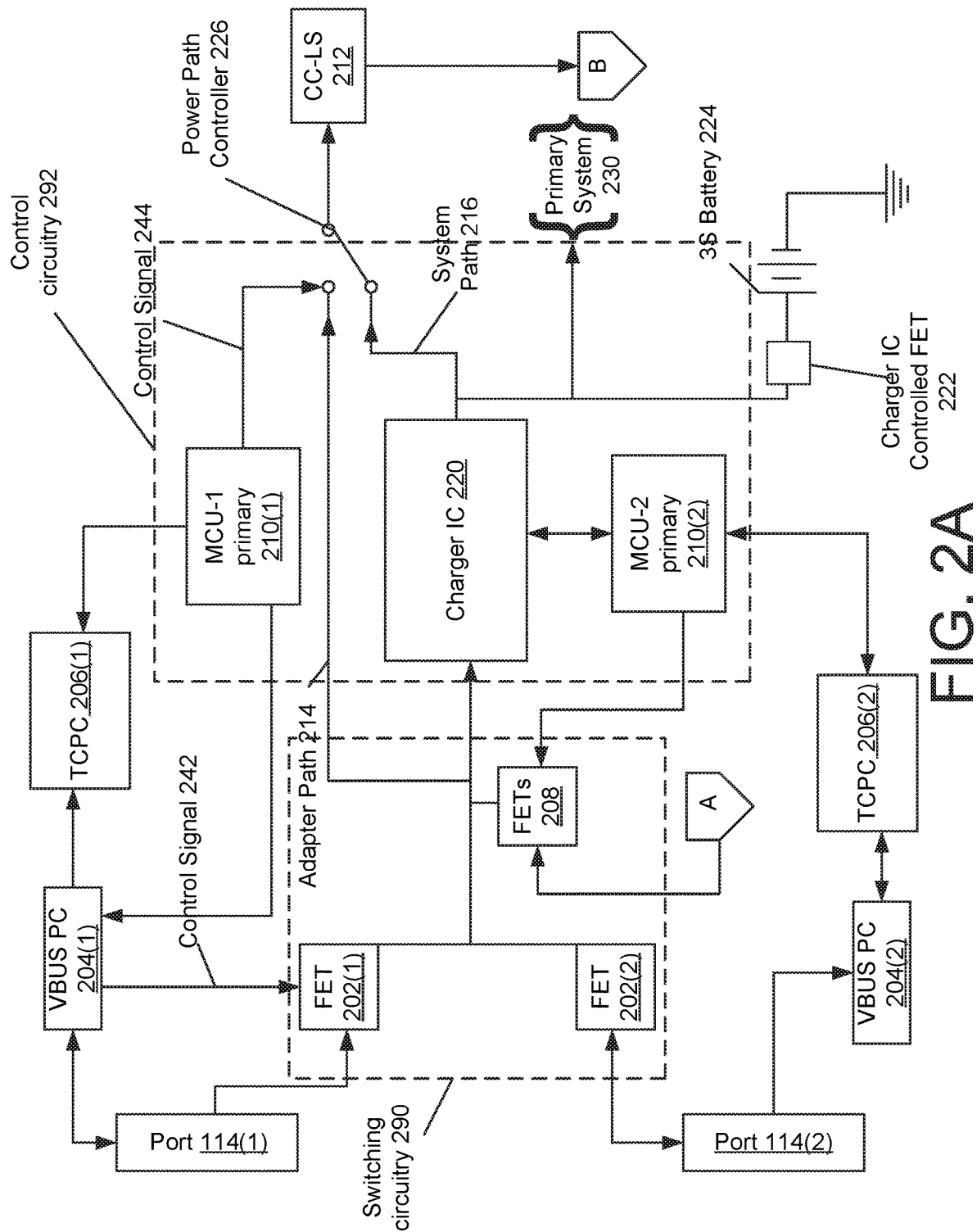
FIG. 2A is a diagram that illustrates an example charger within a first device according to the improvements shown in FIG. 1.

FIG. 2A is a diagram providing a more detailed illustration of the charging circuitry 112. The charging circuitry 112 as illustrated in FIG. 2A has ports 114(1) and 114(2). Charging circuitry having more than 2 ports are possible and involve a similar component layout as that illustrated in FIG. 2A. In some implementations, the ports 114(1) and 114(2) are USB-C ports.

The charging circuitry 112 as illustrated in FIG. 2A includes switching circuitry 290 and control circuitry 292. The switching circuitry 290 is configured to direct current to or from the battery 224 depending on the state of charge of the battery 224 and the battery of a second device, e.g., battery 274 illustrated in FIG. 2B. The control circuitry 292 is configured to set the voltage of the electrical power to that of a system voltage or that of a higher, adapter voltage. In some implementations, the system voltage may be about 10V while the adapter voltage may be 30V. During operation, the switching circuitry 290 receives data concerning the states of charge of the batteries 224 and 274 and configures the charging circuitry 112 to direct electrical power according to these states of charge. The control circuitry 292 selects as a voltage either the system voltage or the adapter voltage according to where the electrical power is directed.

The switching circuitry 290 as illustrated in FIG. 2A includes a set of FETs 202(1) and 202(2) and a set of FETs 208. The control circuitry 292 as illustrated in FIG. 2A includes a microcontroller unit ("MCU") MCU-1 first 210(1) and MCU-2 first 210(2) (which are parts of a single MCU), a charger integrated circuit (IC) 220, and a power path controller 226.

The charging circuitry 112 as illustrated in FIG. 2A also includes, as components, a pair of virtual bus ("VBUS") path controllers (PCs) 204(1) and 204(2), a pair of type-C port controllers (TCPCs) 206(1) and 206(2), a current-controlled load switch (CC-LS) 212, and a charger IC controller 222. Also shown are a 3S battery 224 (i.e., 3 cells in series) and a primary system 230.

The set of FETS 202(1) and the set of FETS 202(2) are each configured to perform respective switching operations to control the flow of electric power into the charging circuitry 122. Along these lines, in response to receiving a signal at a VBUS pin of the port 114(1), the set of FETS 202(1) may receive a control signal from the VBUS PC 204(1) indicating whether the electrical power signal will flow further into the charging circuitry 112. In some implementations, the switching operation performed by the set of FETs 202(1) allows the electric power signal to pass through when the control signal sent by the VBUS PC 204(1) has an amplitude smaller than a threshold. In this way, the switching circuitry 290 may direct electrical power to or from the battery 224.

The VBUS PC 204(1) and the VBUS PC 204(2) are each configured to generate a control signal 242 based on an amplitude of a signal received at a VBUS pin of the respective USB-C port 114(1) and 114(2), the control signal 242 indicating whether the electrical power signal will flow further into the charging circuitry 112. The indication from the VBUS PC 204(1) is based on a policy stored in the TCPC 206(1) and communicated by the MCU-1 first 210(1) that determines a state of the first device 110. For the set of FETs 202(1), electric power will flow when the amplitude of the control signal 242 is less than a threshold (e.g., 5 V).

The TCPC 206(1) and the TCPC 206(2) is configured to store a policy that maps a state of the first device 110 to a control signal that controls the flow of electric power into the charging circuitry 112. The state of the first device 110 may be based on a state of charge of the first device 110, the state of charge of the second device 120A when the first device 110 is connected to the second device 120A, and whether the charging circuitry 112 is connected to the wall 130. Further details concerning the policy are discussed with regard to FIG. 3A.

The set of FETs 208 is configured to perform a switching operation to determine whether the first device 110 accepts electric power from the second device 120A at node "A". The switching operation is also configured to determine whether the electric power signal flows along an adapter path 214 at a higher adapter voltage (providing power to the second device 120A) or along a system path 216 at a lower system voltage (providing power to the first system electronics 230). This determination is based on the state of the first device 110 as described above as well as the magnitude of the electric power signal received from node "A" and communicated via the output of the switching operation performed by either of the set of FETs 202(1) and FETs 202(2).

The MCU-1 first 210(1) and 210(2) is configured to perform processing functions related to determining a state of the first device 110 and mapping the state of the first device 110 to a switching operation at the set of FETs 208 and/or the set of FETs 202(1) and 202(2). The MCU-1 first 210(1) produces control signals that may be sent to the VBUS PC 204(1) and 204(2) and the TCPCs 206(1) and 206(2) over an I2C bus. The MCU-1 first 210(1) is also configured to send control signals 244 to switching circuitry of a power path controller 226 to determine the voltage level of an electric power signal sent to the second device 120A. As shown in FIG. 1, the MCU-1 first 210(1) and MCU-2 first 210(2) are actually part of the same MCU first 210. Further details concerning the MCU first 210 are described with respect to FIG. 3A.

The charger IC 220 is configured to perform voltage conversion operations on electric power signals propagating in the system path 216 to convert the voltage of an electric power signal from a higher adapter voltage to a lower system voltage. Such a converted electric power signal is then sent from the charger IC 220 to the battery 224 via a charger IC controller 222 to power the first system electronics 230 and/or the second device 120A. The charger IC 220 takes the form of a voltage regulator to maintain a constant voltage level in the presence of noise in the charger circuitry 112.

The power path controller 226 includes switching circuitry configured to perform a switching operation to produce electric power signals from either the adapter path 214 or the system path 216. Along these lines, the power path controller 226 receives a control signal 244 from the MCU-1 first 210(1) that triggers the switching operation performed by the switching circuitry. The control signal received is based on the state of the first device 110 as described above. In this way, the switching circuitry 292 may select the system or adapter voltage as described above. The electric power signal that flows beyond the power path controller 226 and the CC-LS 212 is directed to the second device 120A at node "B".

The CC-LS 212 is configured to limit an amount of electric current of an electric power signal passing through the power path controller 226. The CC-LS 212 accordingly protects both the first device 110 and the second device 120A from current spikes.

Figure 2B:
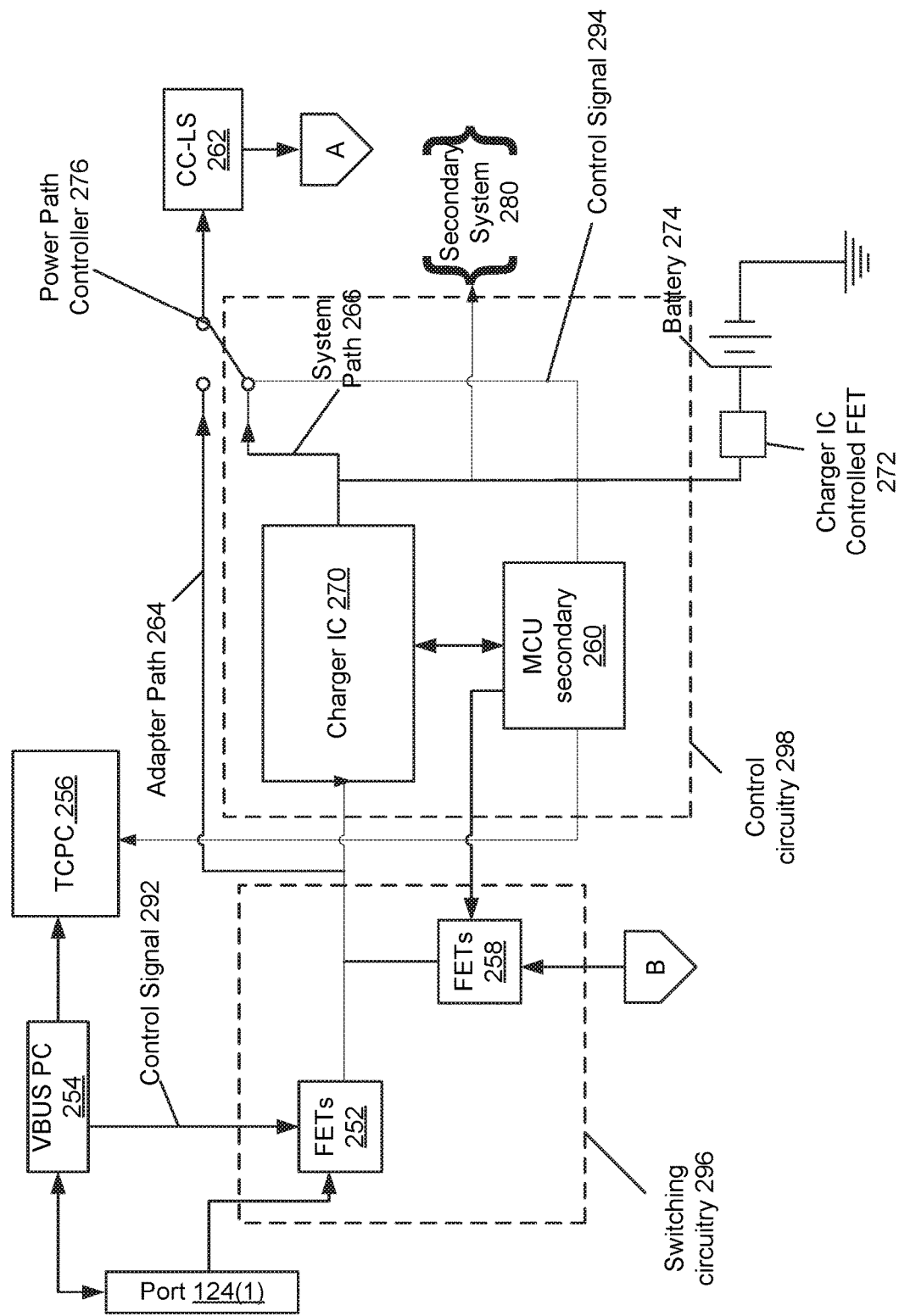
FIG. 2B is a diagram that illustrates an example charger within a second device according to the improvements shown in FIG. 1.

FIG. 2B is a diagram providing a more detailed illustration of the charging circuitry 114A. The charging circuitry 114A includes switching circuitry 296 and control circuitry 298. The switching circuitry 296 is configured to direct current to or from the battery 274 depending on the state of charge of the battery 224 and the battery 274. The control circuitry 298 is configured to set the voltage of the electrical power to that of a system voltage or that of a higher, adapter voltage. In some implementations, the system voltage may be about 10V while the adapter voltage may be 30V. During operation, the switching circuitry 296 receives data concerning the states of charge of the batteries 224 and 274 and configures the charging circuitry 114A to direct electrical power according to these states of charge. The control circuitry 298 selects as a voltage either the system voltage or the adapter voltage according to where the electrical power is directed.

The switching circuitry 296 includes a set of nFETs 252 and a set of FETs 258. The control circuitry 298 includes a MCU-second 260, a charger IC 270, and a power path controller 276.

The charging circuitry 114A as illustrated in FIG. 2B also includes, as components, a VBUS PC 254, a TCPC 256, a CC-LS 262, and a charger IC controller 272. Also shown are a battery 274 and a second system 280.

The set of nFETS 252 is configured to perform respective switching operations to control the flow of electric power into the charging circuitry 122(1). Along these lines, in response to receiving a signal at a VBUS pin of the USB-C port 124(1), the set of nFETS 252 may receive a control signal from the VBUS PC 254 indicating whether the electrical power signal will flow further into the charging circuitry 122(1). In some implementations, the switching operation performed by the set of nFETs 252 allows the electric power signal to pass through when the control signal sent by the VBUS PC 254 has an amplitude smaller than a threshold.

The VBUS PC 254 is configured to generate a control signal 292 based on an amplitude of a signal received at a VBUS pin of the USB-C port 124(1), the control signal 292 indicating whether the electrical power signal will flow further into the charging circuitry 122(1). The indication from the VUS PC 254 is based on the policy stored in the TCPC 206(1) and communicated by the MCU-1 first 210(1) to the MCU second 260 that indicates a state of the first device 110. For the set of nFETs 252, the electric power will flow when the amplitude of the control signal 292 is less than a threshold (e.g., 5 V).

The TCPC 256 is configured to communicate a policy that maps a state of the first device 110 to a control signal that controls the flow of electric power into the charging circuitry 112. As described above, the state of the first device 110 may be based on a state of charge of the first device 110, the state of charge of the second device 120A when the first device 110 is connected to the second device 120A, and whether the charging circuitry 112 is connected to the wall 130. Further details concerning the policy are discussed with regard to FIG. 3A.

The set of FETs 258 is configured to perform a switching operation to determine whether the second device 120A accepts electric power from the first device 110 at node "B". The switching operation is also configured to determine whether the electric power signal flows along an adapter path 264 at a higher adapter voltage (providing power to the first device 110) or along a system path 266 at a lower system voltage (providing power to the second system electronics 280). This determination is based on the state of the first device 110 as described above as well as the magnitude of the electric power signal received at node "B" and communicated via the output of the switching operation performed by the set of nFETs 252.

The MCU-1 second 260 is configured to perform processing functions related to acquiring a state of the first device 110 and mapping the state of the first device 110 to a switching operation at the set of FETs 258 and/or the set of nFETs 252. The MCU-1 second 260 produces control signals 292 that may be sent to the VBUS PC 254 and the TCPC 256 over an I2C bus. The MCU second 260 is also configured to send control signals 294 to switching circuitry of a power path controller 276 to determine the voltage level of an electric power signal sent to the second device 120A. Further details concerning the MCU second is described with respect to FIG. 3B.

The charger IC 270 is configured to perform voltage conversion operations on electric power signals propagating in the system path 266 to convert the voltage of an electric power signal from a higher adapter voltage to a lower system voltage. Such a converted electric power signal is then sent from the charger IC 270 to the battery 274 via a charger IC controller 272 to power the second system electronics 280 and/or the first device 110. The charger IC 270 takes the form of a voltage regulator to maintain a constant voltage level in the presence of noise in the charger circuitry 122(1).

The power path controller 276 includes switching circuitry configured to perform a switching operation to produce electric power signals from either the adapter path 264 or the system path 266. Along these lines, the power path controller 276 receives a control signal 294 from the MCU second that triggers the switching operation performed by the switching circuitry. The control signal received is based on the state of the first device 110 as described above. The electric power signal that flows beyond the power path controller 276 and the CC-LS 262 is directed to the first device 110 at node "A".

The CC-LS 262 is configured to limit an amount of electric current of an electric power signal passing through the power path controller 276. The CC-LS 262 accordingly protects both the first device 110 and the second device 120A from current spikes.

Figure 3A:
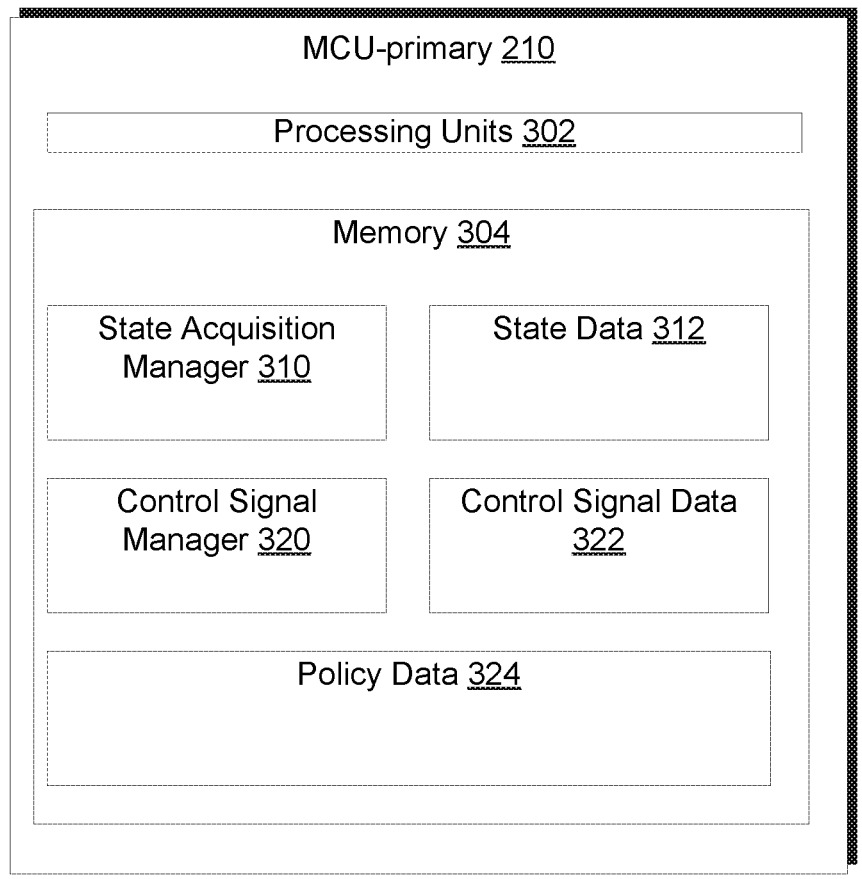
FIG. 3A is a diagram that illustrates an example microprocessing unit of the charger within the first device shown in FIG. 2A.

FIG. 3A is a diagram providing further detail with respect to the MCU-first 210. As shown in FIG. 3A, the MCU-first 210 includes a set of processing units 302 and a memory 304. The set of processing units 302 include one or more processing chips and/or assemblies. The memory 304 includes both volatile memory (e.g., RAM) and non-volatile memory, such as one or more ROMs, disk drives, solid state drives, and the like. The set of processing units 302 and the memory 304 together form control circuitry, which is configured and arranged to carry out various methods and functions as described herein.

In some embodiments, one or more of the components of the MCU-first 210 can be, or can include processors (e.g., processing units 302) configured to process instructions stored in the memory 304. Examples of such instructions as depicted in FIG. 3A include a state acquisition manager 310 and a control signal manager 320. Further, as illustrated in FIG. 3A, the memory 304 is configured to store various data, which is described with respect to the respective managers that use such data.

The state acquisition manager 310 is configured to determine the state of the first device 110 as state data 312. As described above, the state data 312 indicates any of various charging states of the battery 190 as illustrated in FIGS. 1B-1I. For example, when a second device, e.g., second device 120A is connected to the first device 110, the state of charge of the battery 190 is less than 100%, the state of charge of the battery 195A is greater than the state of charge of the battery 190, and the first device is not connected to the power source 130, the charging circuitry 122(1) is configured to direct electric power to the battery 190. In some implementations, when the state of charge of the battery 190 is greater than a threshold (e.g., 50%) and the state of charge of the battery 195A, the charging circuitry 122A is configured to accept electric power from the battery 190. In some implementations, the charging circuitry 122A is configured to direct electric power directly from the power source 130.

In some implementations, the state data 312 is expressed as a numeral, e.g., "1" indicates that second device 120A is connected to the first device 110, e.g., via connection 130(1), the state of charge of the first device 110 is less than 100%, the state of charge of the second device 120A is greater than the state of charge of the first device 112, and the first device is not connected to the wall 130, and so on.

The control signal manager 320 is configured to generate control signal data 322 based on the state data 312 and transmit, as a control signal, the control signal data to various switching circuitry of the first device 110 and the second device 120A as described above. In some implementations, the control signal data 322 takes the form of a voltage pulse having an amplitude greater than or less than a threshold, e.g., 5 V such that a switching operation is triggered when the amplitude is greater than or less than the threshold.

The control signal manager 320 generates control signal data 322 according to policy data 324. In some implementations, the policy data 324 includes a set of rules for mapping state data 312 to control signal data 322. For example, when the state has the value "1" as described above, then a sample rule of the policy data 312 would cause the control signal manager 320 to generate a control signal 242 that is greater than 5 V to deactivate the nFET 202(1) and block power to flow from the VBUS of the USB-C port 114(1), but allow power to flow from the second device 120A at node "A" to the charger IC 220 along the system path 216 and the battery 224. In some implementations, the policy data 324 is provided by a user via an application programming interface. In some implementations, the policy data 324 includes instructions that are provided during manufacture and are not available to be edited by a user.

In some implementations, the memory 304 can be any type of memory such as a random-access memory, a disk drive memory, flash memory, and/or so forth. In some implementations, the memory 304 can be implemented as more than one memory component (e.g., more than one RAM component or disk drive memory) associated with the components of the MCU-first 210. In some implementations, the memory 304 can be, or can include, a non-local memory. For example, the memory 304 can be, or can include, a memory shared by multiple devices (not shown).

The components (e.g., modules, processing units 302) of the MCU-first 210 can be configured to operate based on one or more platforms (e.g., one or more similar or different platforms) that can include one or more types of hardware, software, firmware, operating systems, runtime libraries, and/or so forth.

The components of the MCU-first 210 can be, or can include, any type of hardware and/or software configured to process attributes. In some implementations, one or more portions of the components shown in the components of the MCU-first 210 in FIG. 3A can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the MCU-first 210 can be, or can include, a software module configured for execution by at least one processor (not shown). In some implementations, the functionality of the components can be included in different modules and/or different components than those shown in FIG. 3A.

In some embodiments, one or more of the components of the MCU-first 210 can be, or can include, processors configured to process instructions stored in a memory. For example, the state acquisition manager 310 (and/or a portion thereof) and the control signal manager 320 (and/or a portion thereof) can be a combination of a processor and a memory configured to execute instructions related to a process to implement one or more functions.

Figure 3B:
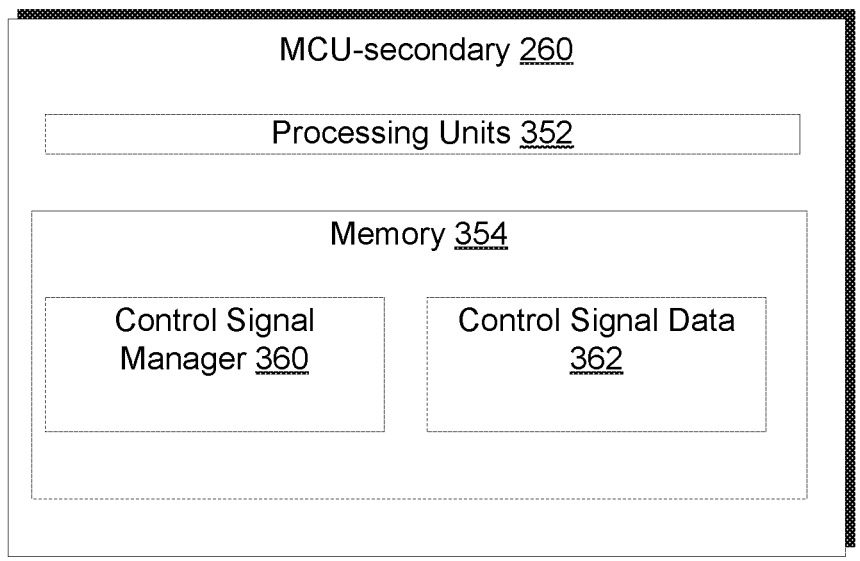
FIG. 3B is a diagram that illustrates an example microprocessing unit of the charger within the second device shown in FIG. 2A.

FIG. 3B is a diagram providing further detail with respect to the MCU-second 260. As shown in FIG. 3B, the MCU-second 260 includes a set of processing units 352 and a memory 354. The set of processing units 352 include one or more processing chips and/or assemblies. The memory 354 includes both volatile memory (e.g., RAM) and non-volatile memory, such as one or more ROMs, disk drives, solid state drives, and the like. The set of processing units 352 and the memory 354 together form control circuitry, which is configured and arranged to carry out various methods and functions as described herein.

In some embodiments, one or more of the components of the MCU-second 260 can be, or can include processors (e.g., processing units 352) configured to process instructions stored in the memory 354. Examples of such instructions as depicted in FIG. 3B include a control signal manager 360. Further, as illustrated in FIG. 3B, the memory 354 is configured to store various data, which is described with respect to the respective managers that use such data.

The control signal manager 360 is configured to generate control signal data 362 based on the state data 312 and transmit, as a control signal, the control signal data to various switching circuitry of the first device 110 and the second device 120A as described above. In some implementations, the control signal data 362 takes the form of a voltage pulse having an amplitude greater than or less than a threshold, e.g., 5 V such that a switching operation is triggered when the amplitude is greater than or less than the threshold.

The control signal manager 360 generates control signal data 362 according to policy data 324 as described above. For example, when the state has the value "1" as described above, then a sample rule of the policy data 312 would cause the control signal manager 360 to generate a control signal 242 that is greater than 5 V to deactivate the nFET 252 and block power to flow from the VBUS of the USB-C port 124(1), but allow power to flow to the first device 110 to node "A" along the adapter path 214.

In some implementations, the memory 354 can be any type of memory such as a random-access memory, a disk drive memory, flash memory, and/or so forth. In some implementations, the memory 354 can be implemented as more than one memory component (e.g., more than one RAM component or disk drive memory) associated with the components of the MCU-second 260. In some implementations, the memory 354 can be, or can include, a non-local memory. For example, the memory 354 can be, or can include, a memory shared by multiple devices (not shown).

The components (e.g., modules, processing units 352) of the MCU-second 260 can be configured to operate based on one or more platforms (e.g., one or more similar or different platforms) that can include one or more types of hardware, software, firmware, operating systems, runtime libraries, and/or so forth.

The components of the MCU-second 260 can be, or can include, any type of hardware and/or software configured to process attributes. In some implementations, one or more portions of the components shown in the components of the MCU-second 260 in FIG. 3B can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the MCU-second 260 can be, or can include, a software module configured for execution by at least one processor (not shown). In some implementations, the functionality of the components can be included in different modules and/or different components than those shown in FIG. 3B.

In some embodiments, one or more of the components of the MCU-second 260 can be, or can include, processors configured to process instructions stored in a memory. For example, the control signal manager 360 (and/or a portion thereof) can be a combination of a processor and a memory configured to execute instructions related to a process to implement one or more functions.

Figure 4:
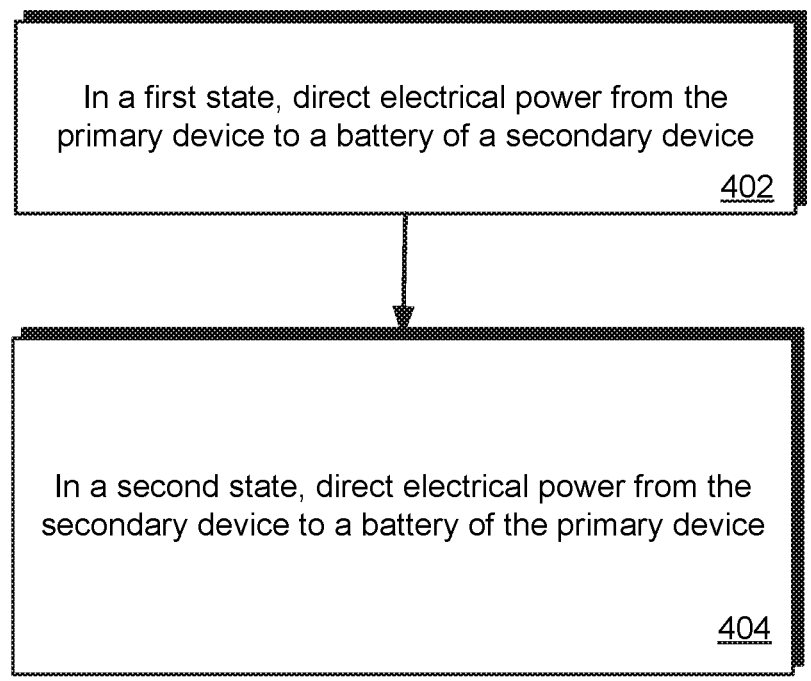
FIG. 4 is a diagram that illustrates an example method of performing the improved techniques within the electronic system shown in FIG. 1.

FIG. 4 illustrates a method 400 is a flow chart depicting an example method 400 of performing the improved techniques described herein. The method 400 may be performed by software constructs described in connection with FIG. 3A, which reside in memory 304 of the MCU-first 210 and are run by the set of processing units 302.

At 402, in response to the first device 210 being in a first state of the plurality of states, the MCU-first 210 directs electrical power from the first device 110 to the battery of the second device 120A via a connection 130(1) between a port 114(1) of the set of charger ports of the first device 110 and a port 124(1) of the set of charger ports of the second device 120A.

At 404, in response to the first device 110 being in a second state of the plurality of states, the MCU-first 210 directs electrical power from the second device 120A to the battery 224 of the first device 110 via the connection 120A between the port 114(1) of the set of charger ports of the first device 110 and the port 124(1) of the set of charger ports of the second device 120A.

Figure 5:
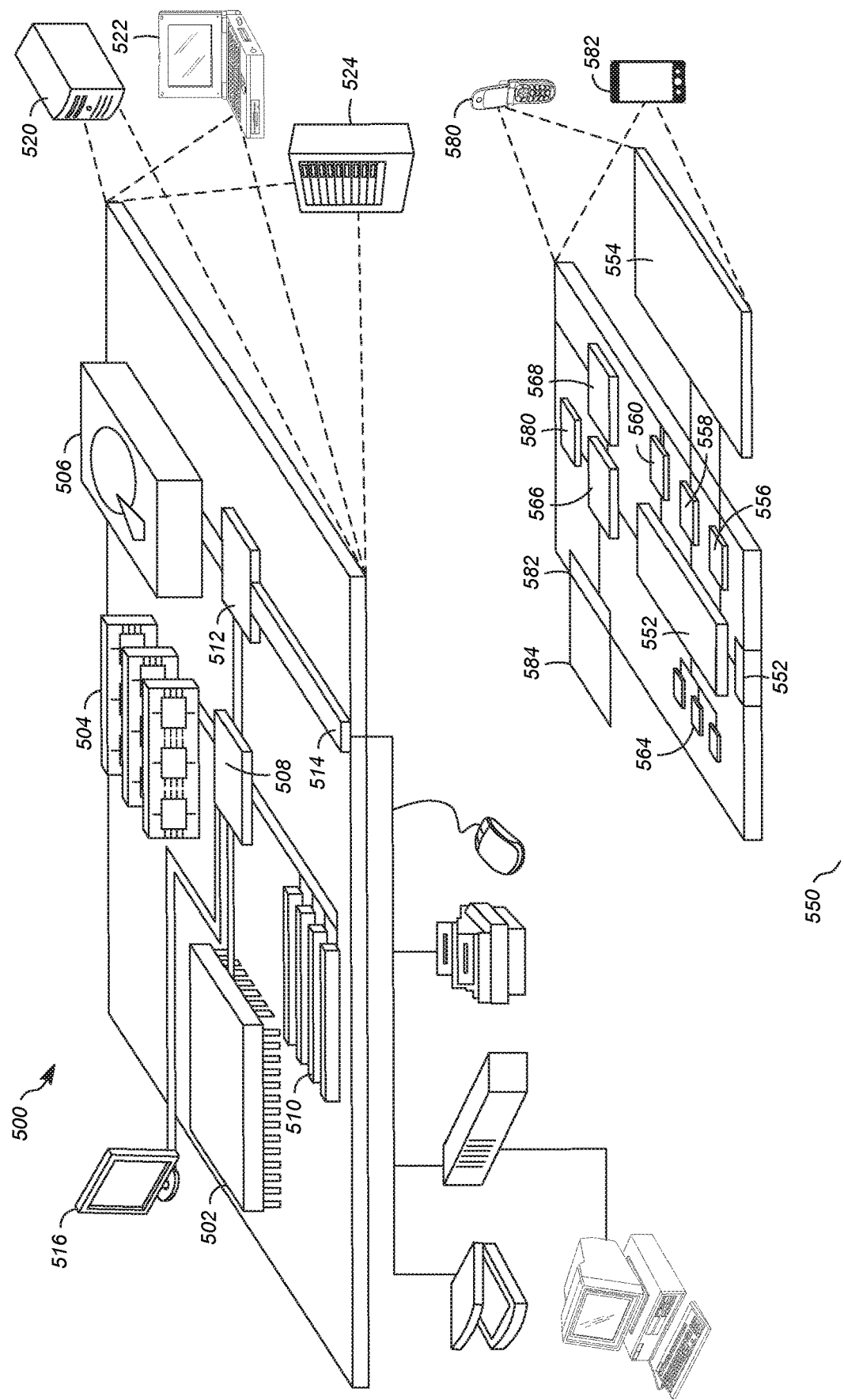
FIG. 5 is a diagram that illustrates an example of a computer device and a mobile computer device that can be used with circuitry described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electronic system, comprising:
a first device including:
   a first charger port associated with a first type-C port controller;
   a second charger port associated with a second type-C port controller;
   a first battery;
   a controlling circuitry coupled to a memory;
   a first current path over which electrical current flows at a voltage equal to an adapter voltage;
   a second current path over which electrical current flows at a voltage equal to a system voltage, the system voltage being less than the adapter voltage; and
   a switching circuitry that switches between the first current path and the second current path to produce electrical current that provides electrical power to a second device when the first device is in a first state of a plurality of states,
the second device including a second charger port and a second battery,
the controlling circuitry of the first device being configured to:
   in response to the first device being in the first state, direct electrical power from the first device to the second battery via a connection between the first charger port and the second charger port; and
   in response to the first device being in a second state of the plurality of states, direct electrical power from the second device to the first battery via the connection between the first charger port and the second charger port, and
the first and second type-C port controllers configured to store policy data representing a policy that maps each of the first state and the second state to a respective control signal, the respective control signal causing the switching circuitry to control the flow of electric current into the first device.

2. The electronic system as in claim 1, wherein the first charger port is a universal serial bus (USB) Type C port.

3. The electronic system as in claim 1, wherein the first state of the plurality of states is indicative of a battery of the first device having a greater percentage of charge than a battery of the second device and the second state of the plurality of states is indicative of a battery of the first device having a smaller percentage of charge than a battery of the second device.

4. The electronic system as in claim 1, wherein the first device further includes a regulator circuitry in the second current path, the regulator circuitry being configured to convert electrical current flowing at the adapter voltage to electrical current flowing at the system voltage.

5. The electronic system as in claim 1, wherein the controlling circuitry is further configured to output a control signal to the switching circuitry, the control signal indicating whether the first device is in the first state or the second state of the plurality of states.

6. The electronic system as in claim 1, wherein the second device further includes:
   a memory; and
   a controlling circuitry coupled to the memory, the controlling circuitry of the second device being configured to:
      send a request to the controlling circuitry of the first device, the request indicating that the controlling circuitry of the first device direct electrical power to the second battery;
      in response to the first device being in the first state of the plurality of states, receive electrical power from the first device and directing the electrical power to the second battery; and
      in response to the first device being in the second state of the plurality of states, receive no electrical power from the first device.

7. The electronic system as in claim 6, wherein the second device further includes:
   a first current path over which electrical current flows at a voltage equal to an adapter voltage;
   a second current path over which electrical current flows at a voltage equal to a system voltage, the system voltage being less than the adapter voltage; and
   a switching circuitry that switches between the first current path and the second current path to produce electrical current that provides the electrical power to the first device when the first device is in the second state of the plurality of states.

8. The electronic system as in claim 7, wherein the second device further includes a regulator circuitry in the second current path, the regulator circuitry being configured to convert electrical current flowing at the adapter voltage to electrical current flowing at the system voltage.

9. The electronic system as in claim 7, wherein the controlling circuitry of the second device is further configured to output a control signal to the switching circuitry, the control signal indicating whether the first device is in the first state or the second state of the plurality of states.

10. An electronic system as in claim 1, wherein the second device further includes a type-C port controller configured to store policy data representing a policy that maps each of the first state and the second state to a respective control signal, the control signal causing the switching circuitry to control the flow of electric current into the first device.

11. A method, comprising:
in response to a first device being in a first state of a plurality of states, directing electrical power from the first device to a battery of a second device via a connection between a first charger port of the first device and a second charger port of the second device;
in response to the first device being in a second state of the plurality of states, directing electrical power from the second device to a battery of the first device via the connection between the first charger port and the second charger port; and
performing a switching operation between a first current path of the first device and a second current path of the first device to provide the electrical power to the second device when the first device is in the first state of the plurality of states, the first current path over which electrical current flows having a voltage equal to an adapter voltage, the second current path over which electrical current flows having a voltage equal to a system voltage, the system voltage being less than the adapter voltage,
the first device further including a first type-C port controller associated with the first charger port of the first device and a second type-C controller associated with the second charger port of the first device, each of the first and second type-C port controllers being configured to store policy data representing a policy that maps each of the first state and the second state to a respective control signal, the respective control signal causing the switching circuitry to control the flow of electric current into the first device.

12. The method as in claim 11, wherein the first state of the plurality of states is indicative of a battery of the first device having a greater percentage of charge than a battery of the second device and the second state of the plurality of states is indicative of a battery of the first device having a smaller percentage of charge than a battery of the second device.

13. The method as in claim 11, performing the switching operation includes converting electrical current flowing at the adapter voltage to electrical current flowing at the system voltage at a regulator in the second current path.

14. The method as in claim 11, further comprising outputting, by the first device, a control signal indicating whether the first device is in the first state or the second state of the plurality of states.

15. The method as in claim 11, further comprising:
sending a request to the first device, the request indicating that the first device direct electrical power to the battery of the second device;
in response to the first device being in the first state of the plurality of states, receiving electrical power from the first device and directing the electrical power to the battery of the second device; and
in response to the first device being in the second state of the plurality of states, receiving no electrical power from the first device.

16. The method as in claim 15, further comprising:
performing a switching operation between a first current path of the second device and a second current path of the second device to provide the electrical power to the first device when the first device is in the second state of the plurality of states, the first current path over which electrical current flows having a voltage equal to an adapter voltage, the second current path over which electrical current flows having a voltage equal to a system voltage, the system voltage being less than the adapter voltage.

17. The method as in claim 16, wherein the method further comprises converting electrical current flowing at the adapter voltage to electrical current flowing at the system voltage.

18. The method as in claim 16, further comprising outputting, by the second device, a control signal indicating whether the first device is in the first state or the second state of the plurality of states.

19. A computer program product comprising a nontransitive storage medium, the computer program product including code that, when executed by processing circuitry of a first device, causes the processing circuitry to perform a method, the method comprising:
in response to the first device being in a first state of a plurality of states, directing electrical power from the first device to a battery of a second device via a connection between a first charger port of the first device and a second charger port of the second device;
in response to the first device being in a second state of the plurality of states, directing electrical power from the second device to a battery of the first device via the connection between the first charger port and the second charger port; and
performing a switching operation between a first current path of the first device and a second current path of the first device to provide the electrical power to the second device when the first device is in the first state of the plurality of states, the first current path over which electrical current flows having a voltage equal to an adapter voltage, the second current path over which electrical current flows having a voltage equal to a system voltage, the system voltage being less than the adapter voltage,
wherein the first device further including includes a first type-C port controller associated with the first charger port of the first device and a second type-C controller associated with the second charger port of the first device, each of the first and second type-C port controllers being configured to store policy data representing a policy that maps each of the first state and the second state to a respective control signal, the respective control signal causing the switching circuitry to control the flow of electric current into the first device.

* * * * *